United States Patent
Ryan et al.

(10) Patent No.: US 6,180,574 B1
(45) Date of Patent: Jan. 30, 2001

(54) SELF-LUBRICATING BEARING AND COATING

(75) Inventors: William E. Ryan, Sussex; William R. Hubiak, West Allis; Julia B. Allaway, Whitefish Bay; Janice N. Fehrenbach, Milwaukee; James M. Strause, Mequon, all of WI (US)

(73) Assignee: Rexnord Corporation, Milwaukee, WI (US)

( * ) Notice: Under 35 U.S.C. 154(b), the term of this patent shall be extended for 0 days.

(21) Appl. No.: 09/571,797

(22) Filed: May 16, 2000

Related U.S. Application Data

(63) Continuation-in-part of application No. 09/213,067, filed on Dec. 16, 1998, now abandoned.

(51) Int. Cl.[7] .......................... C10M 147/02; B05D 3/00
(52) U.S. Cl. ............... 508/106; 106/287.24; 106/287.28; 427/372.2; 427/384; 427/388.1; 427/393.6
(58) Field of Search ...................... 508/106; 106/287.24, 106/287.28

(56) References Cited

U.S. PATENT DOCUMENTS

| | | | |
|---|---|---|---|
| 3,929,396 | 12/1975 | Orkin et al. | 308/241 |
| 3,996,143 | 12/1976 | Orkin et al. | 252/12.4 |
| 4,033,019 | 7/1977 | Orkin | 29/149.5 B |
| 4,060,287 | 11/1977 | Orkin | 308/72 |
| 4,098,988 | 7/1978 | Gisser et al. | 526/328 |
| 4,108,505 | 8/1978 | Orkin | 308/72 |
| 4,126,736 | 11/1978 | Gisser et al. | 526/173 |
| 4,336,150 | 6/1982 | Dorrell | 252/56 R |
| 4,508,761 | 4/1985 | Miyoshi et al. | 427/221 |
| 4,557,974 | 12/1985 | Tsukuda et al. | 428/407 |
| 4,787,991 | 11/1988 | Morozumi et al. | 252/12.4 |
| 4,837,908 | 6/1989 | Beveridge, Jr. | 29/130 |
| 4,867,889 | 9/1989 | Jacobson | 252/12.6 |
| 5,307,660 | 5/1994 | Stoutenburg | 72/42 |
| 5,325,732 | 7/1994 | Vogel | 74/424.8 R |
| 5,334,326 | 8/1994 | Bostick | 252/186.26 |
| 5,346,737 | 9/1994 | Takahashi et al. | 428/36.9 |
| 5,537,746 | 7/1996 | Narkon | 29/898.066 |
| 5,637,558 | 6/1997 | Furey et al. | 508/482 |
| 5,998,339 | * 12/1999 | Kato et al. | 508/106 |
| 6,068,931 | * 5/2000 | Adam et al. | 508/106 |
| 6,121,208 | * 9/2000 | Toyota | 508/106 |

FOREIGN PATENT DOCUMENTS

| | | |
|---|---|---|
| 918756 | 2/1963 | (GB) . |
| WO93/14925 | 8/1993 | (WO) . |

OTHER PUBLICATIONS

Karon Bearing and Coatings Brochure of Kamatics Corporation (date N/A).

* cited by examiner

Primary Examiner—Ellen M. McAvoy
(74) Attorney, Agent, or Firm—Quarles & Brady LLP

(57) ABSTRACT

A self-lubricating coating is provided which includes a mixture of a curable acrylate composition including a dipentaerythritol pentaacylate and a solid lubricant, such as polytetraflourethylenr. The curable acrylate composition may also include triethylene glycol dimethacrylate. An aramid pulp may also be added to the coating mixture. Also disclosed is a method of manufacturing the coating, and a self-lubricating bearing having the coating disposed on its surface.

55 Claims, 2 Drawing Sheets

SELF-LUBRICATING BEARING AND COATING

CROSS-REFERENCE TO RELATED APPLICATIONS

This application is a continuation-in-part of copending U.S. patent application Ser. No. 09/213,067 filed on Dec. 16, 1998.

FIELD OF INVENTION

This invention relates to self-lubricating coatings, and particularly to self-lubricating coatings useful for bearings.

BACKGROUND

Bearings having a self-lubricating coating are known. For example, U.S. Pat. No. 4,134,842 to Orkin discloses a self-lubricating bearing assembly in which one bearing surface is a woven fabric impregnated with a cured acrylate composition. The use of a woven fabric may not be suitable or convenient in some bearing applications, for example, where only a small orifice may be available into which to inject a coating.

In addition, customers demand bearing coatings with good wear properties. Under high temperature conditions, bearings typically wear more quickly. Therefore, a particularly desirable bearing coating would be easy to apply to a variety of surface and would have good wear properties even under high temperature use.

SUMMARY OF INVENTION

The present invention is directed to coatings with lubricating properties which may be applied by a variety of methods to surfaces of various configurations to provide a law friction surface. The coatings of the invention are useful as self-lubricating coatings for bearings and the like. Bearings coated with coatings described herein have been found to have good wear performance even under high pressure and high temperature conditions required for qualification to military specifications. Such test conditions are more stringent than required for most applications, and are therefore a desirable benchmark to measure wear performance. The coating may also permit easier bearing maintenance. A roller bearing with the coating applied to the inside diameter of the inner race may be capable of being removed from a shaft during maintenance, rather than being cut from the shaft and thereby destroyed.

One aspect of the present invention is a coating comprising a mixture of a curable acrylate composition including a dipentaerythritol pentaacrylate; and a solid lubricant. The solid lubricant is preferably a polytetrafluoroethylene. The curable acrylate composition may further include another acrylate. Representative acrylates include triethylene glycol dimethacrylate, epoxy novolac acrylate, pentaerythritol tetraacrylate, diethylene glycol dimethacrylate, tetraethylene glycol dimethacrylate, dipropylene glycol dimethacrylate, tetraethylene glycol diacrylate, pentaerythritol tetramethacrylate, and dipentaerythritol hexaacrylate; with triethylene glycol dimethacrylate being most preferred.

Another aspect of the invention is a method of manufacturing the coating. The method involves admixing a curable acrylate including a dipentaerythritol pentaacrylate, and at least about 10 weight percent of a solid lubricant, based on the weight of the mixture.

Another aspect of the invention is a self-lubricating bearing comprising a bearing surface having the coating disposed thereon. The self-lubricating bearing may be manufactured by applying the coating described above to a bearing; and curing th coating to form a rigid composite.

DETAILED DESCRIPTION OF THE INVENTION

Figure 1:
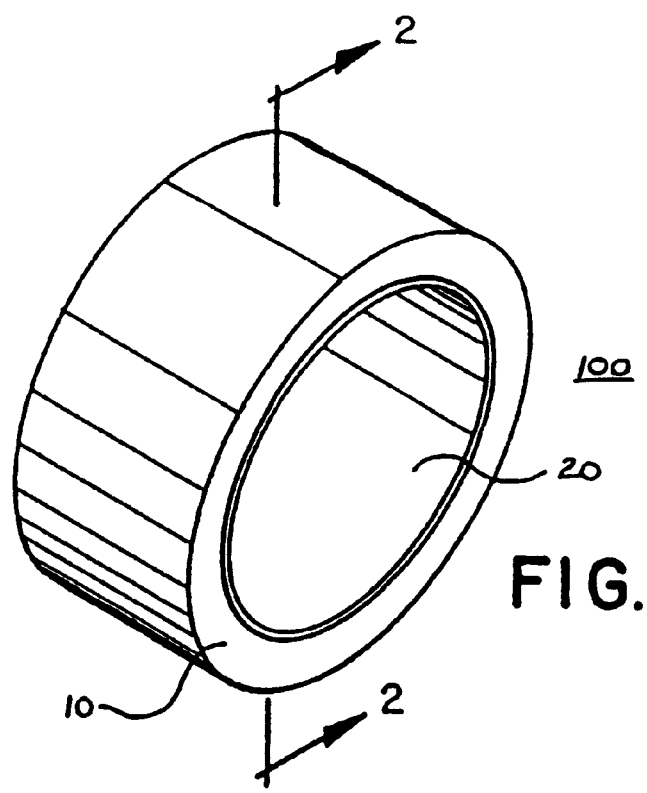
FIG. 1 is a perspective illustration of a self-lubricating bearing of this invention.

The coatings of the invention generally comprise a solid lubricant disposed in a curable acrylate composition including a dipentaerythritol pentaacrylate. The curable acrylate composition may optionally include other acrylates, a thixotrope, an initiator, or an accelerator, each of which will be described below in more detail. Unless otherwise stated, all weight percents are based on the weight of the coating mixture before curing.

In a highly preferred embodiment, the coating comprises a mixture of:
a) at least about 20 weight percent of a dipentaerythritol pentaacrylate;
b) at least about 20 weight percent of a triethylene glycol dimethacrylate;
c) at least about 10 weight percent of a solid polytetrafluoroethylene lubricant;
d) less than about 1 weight percent of an aramid pulp; and
e) an initiator.

Monomers

The curable acrylate composition includes a substituted or unsubstituted dipentaerythritol pentaacrylate. Dipentaerythritol pentaacrylate may be represented by the following general formula:

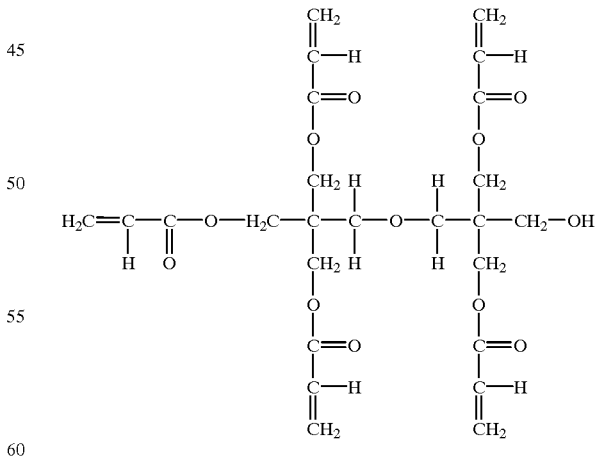

When substituted, the substituent group(s) should not sterically hinder the compound. Preferably, the substituent groups do not include an amino group. Most preferably, the pentaacrylate is unsubstituted dipentaerythritol pentaacrylate and conforms to the general formula above. This pentaacrylate is commercially available, for instance, under the trade name SR-399 (from Sartomer Company of Exton, Pa.) and has a viscosity of about 13,600 centipose (CPS) at 25° C. The pentaacrylate is a high functionality monomer with many substituents capable of polymerizing or crosslinking with other molecules.

Desirably, the curable acrylate composition further includes an acrylate selected from the group consisting of triethylene glycol dimethacrylate ($CH_2C(CH_3)C(O)OC_2H_4OC_2H_4OC_2H_4OC(O)C(CH_3)CH_2$), epoxy novolac acrylate ($CH_2$—$O$—$CHCH_2OC_6H_4CH_2O(CO)CHCH_2$), aliphatic urethane acrylate, and pentaerythritol tetraacrylate ($C(CH_2OC(O)CHCH_2)_4$). Most preferably, the curable acrylate composition includes triethylene glycol dimethacrylate. Triethylene glycol dimethacrylate is commercially available from Sartomer Company (Exton, Pa.) as SR-205 and has a viscosity of about 11 centipose (CPS) at 25° C., which is much less viscous than the dipentaerythritol pentaacrylate.

The individual monomers and the curable acrylate composition are preferably liquid at room temperature for easy workability. The monomer mixture should be thick enough to prevent the solid lubricant from separating from the acrylate composition, and thin enough to permit suitable application of the coating. The choice and ratio of monomers and the amount of thixotrope may be varied to obtain;

coating mixture having a viscosity suited for the desired application. A greater ratio of dipentaerythritol pentaacrylate or additional thixotropes may be added for increas viscosity.

The relative proportion by weight of the dipentaerythritol pentaacrylate monomer to other monomers in the mixture can vary over a range of from about 25 to about 100:0, preferably, from about 45:55 to about 55:45, more preferably, the r, is about 50:50. Preferably, the curable acrylate composition comprises at least abo 30 weight percent of the coating mixture; more preferably, at least about 50 weigh percent; most preferably about 60 weight percent. Preferably, the curable acrylate composition comprises at most about 90 weight percent of the coating mixture. Preferably, the dipentaerythritol pentaacrylate monomer comprises at least about 20 weight percent of the coating mixture; more preferably, at least about 25 weight percent; most preferably about 30 weight percent. This invention contemplates preparation of homopolymers as well as random and block copolymers and terpolymers of the suitable monomers discussed above.

Lubricants

The coating of the invention includes a solid lubricant. Representative solid lubricants include, for example, polytetrafluoroethylene, carbon fiber, molybdenum disulfide, boron nitride, and glass, with polytetrafluoroethylene (PTFE) being most preferred. PTFE is commercially available from E.I. DuPont de Nemours and Company under the trademark TEFLON®. PTFE is available in many forms, such as powder, fiber and particulate form. TEFLON flock is available in different lengths, such as 1/64 inch and 1/32 inch. The 1/64 inch flock form is preferred.

The solid lubricant should be added in an amount sufficient to provide the desired lubricating properties for the coating. Preferably, the solid lubricant comprises at least about 10 weight percent based on the weight of the coating mixture more preferably, at least about 20 weight percent; most preferably at least about 30 weight percent. The solid lubricant should be added in an amount to avoid separation of the solid lubricant from the acrylate composition in order to retain substantially uniform viscosity of the mixture. Preferably, the solid lubricant comprises less than about 60 weight percent of the coating mixture; more preferably, less than about 40 weight percent; most preferably about 38 weight percent.

Thixotrope

The coating may optionally include a thixotrope added in an amount sufficient to give a suitable viscosity and to prevent or minimize separation of the solid lubricant from the monomer mixture. Preferably, the thixotrope is employed in a concentration, based on the weight of the coating mixture, of greater than about 0.01 weight percent; more preferably, greater than about 0.1 weight percent. In order to avoid excessive viscosity leading to a paste-like consistency, the thixotrope is preferably employed in a concentration, based on the weight of the coating mixture, of less than about 3 weight percent; more preferably, less than about 2 weight percent; most preferably, about 0.2 weight percent.

Suitable thixotropes may include fumed silica or aromatic polyamides, aromatic polyamides, including aramid fiber and the like, are preferred. When the mixture includes a thixotrope, such as an aramid pulp, the aramid pulp may provide a more viscous mixture and may reduce shrinkage of the final product. The aramid fibers are preferably in pulp form which consists of fibers that are approximately 12 microns in diameter, each of which is surrounded by many smaller attached fibrils. This product is commercially available from E. I. DuPont de Nemours and Company under the trademark KEVLAR®.

Initiator

An initiator may be employed in an amount sufficient to initiate a reaction under the desired reaction conditions, however, the concentration should not be so high that the shelf life is too short between the time the coating mixture is manufactured and the time the coating is to be applied to a surface. If few inhibitors, such as oxygen, are present in the mixture, adding an initiator can initiate polymerization even without the addition of heat or pressure.

Preferably, the initiator is employed in a concentration, based on the weight c the acrylate monomer mixture, of less than about 1 weight percent; more preferably, less than about 0.5 weight percent; most preferably, about 0.2 weight percent.

Preferably, the initiator is employed in a concentration of greater than about 0.01 weight percent.

Many suitable initiators for acrylate polymerization will be apparent to those skilled in the art such as peroxidic initiators and azo or diazo compounds. Examples of representative peroxidic initiators include cumene hydroperoxide, t-butyl hydroperoxide, methyl ethyl ketone hydroperoxide or peroxide, tetralin hydroperoxide, benzoyl peroxide, lauroyl peroxide and ditertiary butyl diperphthalate. A preferred initiator is benzoyl peroxide (BPO), which may be added as a liquid dispersion or in neat form. In liquid dispersion form the initiator may include 40% benzoyl peroxide, 2.6% active oxygen, in a non-phthalate ester plasticizer. A suitable liquid dispersion is available, for example, as BENOX L-40LV from Norac Company, Inc. of Azusa, Calif. Preferably, the benzoyl peroxide is in neat form, available from Aldrich Chemical Company, Inc. of Milwaukee, Wis.

Accelerator

An accelerator may be added to the mixture in an amount sufficient to shorten the pot life of the mixture to a desired time frame. On the other hand, too much accelerator may harm material performance. Preferably, the accelerator is added in a concentration based on the weight of the monomers of at least about 0.01 percent; more preferably, at least about 0.015 percent. Preferably, the accelerator is added in a concentration based on the weight of the monomers of less than about 0.20 percent; more preferably, less than about 0.10 percent. Representative accelerators include aminoalkyloxyalkylamines, dimethylaniline, diethylaniline, dimethyl-p-toluidine (DMPT), and cobalt napthalate. Additional representative accelerators are discussed in U.S. Pat. No. 4,134,842 to Orkin which is herein fully incorporated by reference. DMPT is most preferred.

Method

In the method of manufacturing the coating, the identities and quantities of the various components in the coating mixture may be as described above. Generally, the method of manufacturing the coating of the invention involves admixing a curable acrylate comprising a dipentaerythritol pentaacrylate, and a solid polyetrafluoroethylene lubricant. If the curable acrylate composition includes other monomers, then those monomers are most advantageously mixed with the dipentaerythritol pentaacrylate before admixing the solid lubricant.

More specifically, one method embodiment involves mixing the dipentaerythritol pentaacrylate and a triethylene glycol dimethacrylate at high shear, admixing the solid lubricant, and, optionally, the aramid pulp; applying the mixture to a bearing surface; and curing the mixture. Optionally, an initiator or an accelerator may be added to the mixture. Typically, the components of the mixture may be added and mixed in any order, however, if both an initiator and an accelerator are employed, then each should be added to separate portions of the curable acrylate composition. The two separate mixtures may then be mixed together to avoid directly mixing the accelerator with the initiator. In a preferred order of addition, the monomers are mixed together first, then any thixotrope; followed by either the initiator or the accelerator, and then the solid lubricant.

When the mixture includes triethylene glycol dimethacrylate, the triethylene glycol dimethacrylate and dipentaerythritol pentaacrylate are preferably mixed together using a high shear mixing process until a uniform mixture is obtained. Sufficient mixing may be achieved after about 15 minutes of high shear mixing. Other methods of mixing may be acceptable, but may not be as expedient.

The monomer mixing is preferably carried out under vacuum to decrease voids in the mixture and subsequent final product. However, if the vacuum is too high (full vacuum or about 30 inches of mercury), then the mixture may begin to react too quickly as the vacuum removes residual oxygen which serves as an inhibitor in the mixture. Preferably, the vacuum is below about 28 inches of mercury. Conversely, if the vacuum is too low, then the residual air may remain in the mixture which can lead to problems in processing and voids in the final product. Preferably, the vacuum is at least about 20 inches of mercury, more preferably, about 25 inches of mercury during acrylate mixing.

The method may further include admixing a thixotrope as defined herein. If more than one monomer is employed, the thixotrope is preferably added after the monomers have been mixed together.

The method preferably includes admixing an initiator or accelerator with the acrylate composition. The mixture may begin to cure after the addition of the initiator.

The solid lubricant is added and mixed thoroughly with the curable acrylate composition before applying the mixture to a bearing surface. Uniform viscosity may be maintained by thoroughly mixing the composition under a vacuum after the addition of each ingredient. Mixing may be carried out in any conventional apparatus, such as a planetary mixer. Coatings prepared by this method may have good viscosity control; in other words, the viscosity remains substantially uniform even after the addition of a solid lubricant.

With respect to curing, a relatively slower cure (longer cure time) is typically preferred. Cure time may be increased, for example, by decreasing the amount of initiator or accelerator, or increasing the amount of oxygen (air) in the material, for example, by decreasing the vacuum under which mixing is performed. Because oxygen in the air acts as a strong inhibitor to the reaction, curing preferably occurs in an inert atmosphere, such as in a nitrogen atmosphere or in an enclosed mold.

In order to reduce the number and size of voids in the final product, the curing may take place under increased pressure. Pressures in the range of about 100 to about 130 psi may be suitable. The product should be left in these conditions until it is cured. The polymerization reaction occurs at a temperature which will vary depending on the amount of inhibitor, initiator, and accelerator in the mixture. Typically, reaction temperature is in the range of about 20° C. to about 100° C., and is preferably about ambient temperature. The polymerization reaction which occurs during curing is typically complete within about one hour, although reaction time may vary depending on such factors as the amount and type of starting materials, the presence of an initiator or accelerator, pressure and temperature.

In addition to curing in an inert environment, the mixture may be cured by heat. However, elevated temperatures, even as low as 120° F. (49° C.), may cause the reaction to proceed too quickly. A fast cure may cause the product to crack or craze. Further, if the coating is too thick, then a greater exotherm is generated upon heat curing. If a fast cure is desired, then elevated temperatures, for example, in the range of from about 40° C. to about 120° C., and preferably about 70° C. may be employed.

After polymerization is substantially complete (i.e. after the article has cured) the article may be post-cured to increase cross-link density. As is known, additional cross-linking may be accomplished by post-curing polymers at an elevated temperature. The temperature may be ramped up gradually to a desired elevated temperature and held for a sufficient time to permit full cure.

Self-Lubricating Bearing

Figure 2:
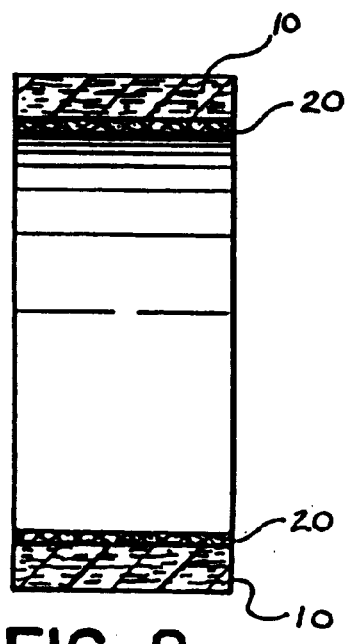
FIG. 2 is a cross-sectional view of the bearing of FIG. 1 taken through line 2—2.

FIGS. 1 and 2 show a self-lubricating bearing. The bearing 100 comprises a shell 10 having a surface thereon. Disposed on this bearing surface, is a coating 20 comprising the coating described above. Prior to polymerization, the acrylate resin includes dipentaerythritol pentaacrylate monomer. After polymerization, the dipentaerythritol pentaacrylate may be part of a homopolymer, a copolymer, or a blend.

After all of the desired components have been mixed together, the coating may be applied to a variety of substrates. Representative substrates include ceramics, glasses, plastics, composites, and metals such as metal alloys, stainless steel, carbon steel, ferrous steel and aluminum, etc. Preferably, the substrate is a bearing made of any customary bearing material, such as ceramics or metals, with an aluminum or steel being most preferred. More preferably, the steel is a stainless steel. Customary bearing substrates include 2024 T851 aluminum and 174 PH stainless steel.

As used herein, the term "bearing" refers to at least one of two engaging members movable relative to one another. Thus, a bearing can be in any configuration such as a sleeve bearing, a spherical or ball bearing, a flat surface, etc. The contacting member which engages with the coating on the bearing does not require any special coating or treatment, however, a steel polished surface such as a 5 to 8 microfinish is recommended. A rougher contacting surface may wear the coating faster.

In a preferred embodiment, the self-lubricating bearing comprises: a bearing having a surface; and a lubricating coating disposed on at least a portion of the surface, the coating comprising a mixture of: i) an acrylate composition including a dipentaerythritol pentaacrylate; and ii) a polytetrafluoroethylene lubricant. More preferably, the mixture includes at least about 10 weight percent polytetrafluoroethylene; and at least about 30 weight percent of the acrylate composition.

The herein described coating, including preferences regarding additional components and relative ratios of the components in the coating mixture, applied to the self-lubricating bearing and the method of making the self-lubricating bearing.

Turning now to the method of manufacturing the self-lubricating bearing, the method generally comprises: applying a coating to a bearing, and curing the coating to form a rigid composite. The coating may then be machined to precise dimensions. The coating comprises a mixture of a dipentaerythritol pentaacrylate and a polytetrafluoroethylene. Suitable methods for applying the coating include spraying, spinning, injection or other methods known in the art for applying a coating to a bearing surface.

In order to enhance adhesion of the coating to the substrate, especially metal substrates, the bearing surface may be cleaned and roughened by vapor blasting or grit blasting with blasting media before the coating is applied. Various blasting media are known in the art, including aluminum oxide, and glass beads. Preferably, the substrate is grit blasted with aluminum oxide.

Coating thickness may be varied conventionally by applying more or less material to the surface and by machining. If the coating is applied by spraying, as with an air gun, the pressure should be sufficient to atomize the mixture. A pressure of about 60 psi is generally suitable. In addition, high speed spinning at a rate of about 2,000 to 12,000 revolutions per minute (rpm) may help to conveniently and quickly spread the coating mixture on the inner diameter of a tubular bearing.

Injection molding may be a useful application method for bearings such as spherical ball bearings and other parts having small orifices into which the coating mixture may be injected. One advantage of injection is that air tends to be purged from the mixture, which minimizes void problems in the final product, and which facilitates an anaerobic cure.

After coating application, the coating may be cured as described in the above process. If the application results in a surface which is too uneven or too thick for the desired application, then, after the mixture cures to a sufficient hardness, the coating may be machined to a suitable uniform thickness, such as about 0.015 inches, or about 0.010 inches.

In order to minimize cracks or crazing during the post cure process, the coating is preferably machined to a thickness only slightly greater than the specified thickness; typically, 0.005 inches additional thickness is adequate. The post-curing, or second curing stage, may be carried out in an oven at a temperature of from about 70° C. to about 180° C.; preferably about 120° C. to about 170° C. The duration of the post-cure may vary depending in part on the temperature. Typically, a slow post-cure is preferred because post curing too rapidly may degrade the material performance. Desirably, the coating is post-cured for greater than about 16 hours; more preferably, about 48 hours.

Various specific examples of preparing the coating and self-lubricating bearing of the invention via the process of the invention are provided below.

EXAMPLES

Example 1

A self-lubricating bearing is made by preparing a coating and applying it to a bearing as follows: A ½ inch inner diameter (ID) 2024 aluminum bearing is cleaned by grit blasting with 60 grit aluminum oxide. The bearing is then rinsed in water and cleaned in an ultrasonic cleaner with a weak acidic cleaning solution. The bearing is rinsed in purified deionized water and dried in hot air.

The coating composition is prepared by mixing two batches of monomer in a planetary mixer equipped with a high shear blade. Each batch contains 470 grams (g) of triethylene glycol dimethacrylate and 470 grams of dipentaerythritol pentaacrylate. Mixing occurs under a vacuum of about 25 inches of mercury for about 15 minutes. 2.8 grams of KEVLAR aramid pulp is added to each batch and mixed about 10 minutes. To one batch (part A) is mixed 4.1 grams of benzoyl peroxide in crystal form as an initiator. To the other batch (part B) is mixed 0.5 grams dimethyl-p-toluidine as an accelerator. 590 grams of 1/64 inch TEFLON PTFE flock is added to each monomer mixture and mixed with paddles at low shear for about 15 minutes.

Separate cartridges are filled with parts A and B, and air is bled off from each cartridge. Cartridges A and B are assembled with a static mixer nozzle and loaded in a dispenser which simultaneously advances the pistons of cartridges A and B. The nozzle of the static mixer has at least 4 mixers, preferably 8. The mixtures in cartridges A and B are expelled together through the static mixer under the pressure of pistons to a controlled amount of 1.0 cubic centimeters (cc) and applied directly to the inside diameter of the ½ inch bearing.

The bearing is spun at high speed (about 8,000 RPM for about 30 seconds) to assist in spreading the mixture on the bearing's inner surface to a thickness of about 0.060 inches. The bearing is placed in a cure vessel under a nitrogen (or other inert, non-oxygen gas) atmosphere and pressurized to about 100–130 psi for about 3 hours. The pressure is released and the coating is machined to a uniform thickness of about 0.015 inches. The bearing coating is then post-cured by ramping the temperature to about 340° F. (171° C.) and ramping down for a total cure cycle of about 16 to 48 hours. The coating is machined to a final thickness of about 0.010 inches.

Example 2

A mixture of 5 grams dipentaerythritol pentaacrylate (SR-399) and 5 grams triethylene glycol dimethacrylate (SR-205) is admixed with 0.1 grams liquid dispersion of BPO, 0.01 grams DMPT, and 6 grams TEFLON PTFE. The mixture is stirred and applied to the inner diameter of a 1 inch ID bearing cleaned by vapor blasting. The coating is cured at 170° C. for about 24 hours. The coated bearing is subjected to a high temperature oscillation test at 325° F. (163° C.) over 25,000 cycles in accordance with MIL-B-81934. This specification also entails placing the part in an oven and soaking it for 24 hours in one of six fluids commonly used in the aerospace industry, like JP-4 fuel, hydraulic fluids, and anti-icing fluid. The part is placed on a pin and oscillated 10x/minute over +/−25 degrees of rotation. The wear of the coating measured less than the maximum allowable wear of 0.0060 inches at 25,000 cycles for the high temperature and fluid-soak conditions, and 0.0045 inches for ambient conditions.

Example 3

A sample coated bearing was prepared as in Example 2 except 10 grams of dipentaerythritol pentaacrylate (SR-399) was used instead of 5 grams each of two different monomers. The bearing was subjected to the same high temperature oscillation test as in Example 2 and also had less than the maximum allowable wear of 0.0060 inches at 25,000 cycles.

Example 4

Several ½ inch diameter by ⅜ inch wide aluminum bearing samples were prepared as in Example 2 except that KEVLAR aramid pulp was added to the mixture, and the initiator and accelerator were varied to improve the processing conditions. The coated bearings were subjected to an oscillation test after soaking in Skydrol hydraulic fluid in accordance with MIL-B-81934. Skydrol tended to be the most aggressive test fluid. The conditions of this test include: radial load=6,300 pounds, 24 hour soak in Skydrol at 160° F. (71° C.); +/−25 degrees oscillation at 10 cycles per minute (cpm). Samples passed the test by having less than the maximum allowable wear of 0.0060 inches at 25,000 cycles.

Example 5

Several sample coated bearings were prepared as in Example 2 except that KEVLAR aramid pulp was included in the mixture. Ambient oscillation testing was carried out at in accordance with MIL-B-81934. All samples tested passed the test by having less than the 0.0045 inch maximum allowable wear at 25,000 cycles at room temperature.

Comparative Example

A sample was prepared as in Example 3 except 10 grams of triethylene glycol dimethacrylate (SR-205) was used instead of 10 grams of dipentaerythritol pentaacrylate. The bearing was subjected to the same high temperature oscillation test as in Examples 2 and 3, and had greater than the maximum allowable wear of 0.0060 inches at 25,000 cycles, thus failing the test requirements of NIL-B-81934.

Figure 3:
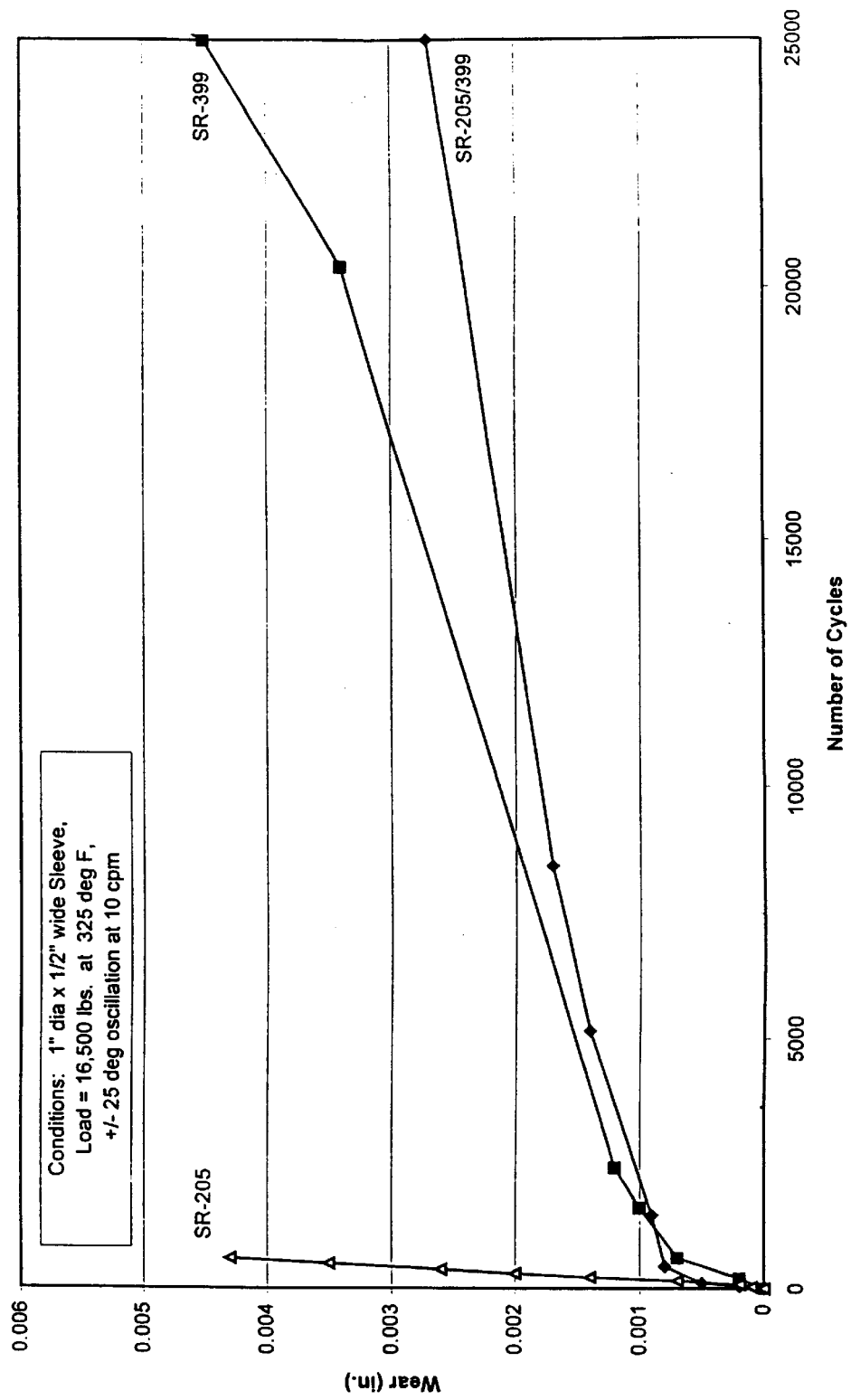
FIG. 3 is a graphical depiction of wear depth in inches as a function of number of cycles in an oscillation test for various coatings under high pressure and high temperature conditions.

Turning now to FIG. 3, FIG. 3 is a graphical depiction of wear depth in inches as a function of number of cycles at an oscillation of +/−25 degrees under high temperature conditions of 325° F. (163° C.) for coatings prepared as described in Examples 2 and 3 and in the Comparative Example. FIG. 3 shows that utilizing triethylene glycol dimethacrylate without dipentaerythritol pentaacrylate (as in Comparative Example) gives a coating with relatively poor high temperature performance. Further, the solid lubricant tends to separate out of the coating mixture. In contrast, dipentaerythritol pentaacrylate alone (as in Example 3) provides good high temperature performance, as does a mixture of dipentaerythritol pentaacrylate and triethylene glycol dimethacrylate (as in Example 2).

We claim:

1. A surface coating comprising a mixture of:
   a) a curable acrylate composition including a dipentaerythritol pentaacrylate; and
   b) a solid lubricant.
2. The surface coating of claim 1 wherein the solid lubricant comprises a polytetrafluoroethylene.
3. The surface coating of claim 1 wherein the curable acrylate composition further includes an acrylate selected from the group consisting of a triethylene glycol dimethacrylate, an epoxy novolac acrylate, and a pentaerythritol tetraacrylate.
4. The surface coating of claim 1 wherein the curable acrylate composition further comprises a triethylene glycol dimethacrylate.
5. The surface coating of claim 1 wherein the mixture includes a thixotrope.
6. The surface coating of claim 5 wherein the thixotrope includes an aramid pulp.
7. The coating of claim 1 wherein the curable acrylate composition comprises at least about 30 weight percent of the mixture.
8. The coating of claim 1 wherein the solid lubricant comprises at least about 10 weight percent of the mixture.
9. The coating of claim 5 wherein the thixotrope comprises less than about 1 weight percent of the mixture.
10. The coating of claim 2 wherein the polytetrafluoroethylene is in fibrous form.
11. The coating of claim 1 wherein the mixture further comprises neat benzoyl peroxide.
12. The coating of claim 8 wherein the curable acrylate further comprises triethylene glycol dimethacrylate.
13. The coating of claim 12 wherein the mixture includes:
    a) at least about 20 weight percent of the dipentaerythritol pentaacrylate;
    b) at least about 20 weight percent of the triethylene glycol dimethacrylate;
    c) at least about 10 weight percent of the solid lubricant, wherein the solid lubricant includes a polytetrafluoroethylene;
    d) less than about 1 weight percent of an aramid pulp; and
    e) an initiator,
    wherein all weight percents are based on the weight of the mixture.
14. The coating of claim 13 wherein the initiator comprises neat benzoyl peroxide.
15. The coating of claim 13 wherein the initiator comprises less than about 2 weight percent based on the weight of the curable acrylate composition.
16. The coating of claim 1 made by a process comprising:
    a) admixing the curable acrylate composition with the solid lubricant to form a mixture, wherein the solid lubricant includes a polytetrafluoroethylene and the solid lubricant comprises at least about 10 weight percent of the mixture; and
    b) curing the mixture.
17. A method of manufacturing a coating, the method comprising mixing:
    a curable acrylate comprising a dipentaerythritol pentaacrylate, and at least about 10 weight percent of a solid lubricant to form a coating mixture, wherein the weight percent is based on the weight of the coating.
18. The method of claim 17 wherein the solid lubricant includes polytetrafluoroethylene.

19. The method of claim 17 wherein the curable acrylate further comprises a triethylene glycol dimethacrylate.

20. The method of claim 19 wherein the triethylene glycol dimethacrylate and the dipentaerythritol pentaacrylate are mixed together at high shear prior to admixing the solid lubricant.

21. The method of claim 20 further comprising admixing an aramid pulp with the curable acrylate after the triethylene glycol dimethacrylate and dipentaerythritol pentaacrylate are mixed together.

22. The method of claim 19 wherein the triethylene glycol dimethacrylate and the dipentaerythritol pentaacrylate are mixed together under a vacuum.

23. The method of claim 20 further comprising admixing less than about 1 weight percent aramid pulp with the curable acrylate and the solid lubricant, and wherein the solid lubricant comprises polytetrafluoroethylene.

24. The method of claim 17 further comprising:
admixing an initiator with a portion of the curable acrylate to form a part A;
admixing an accelerator with a separate portion of the curable acrylate to form a part B; and
mixing the part A with the part B.

25. The method of claim 17 further comprising applying the coating mixture to a substrate, and curing the coating mixture.

26. A self-lubricating bearing comprising:
a) a bearing having a surface; and
b) a lubricating coating disposed on at least a portion of the surface, the coating comprising a mixture of:
i) an acrylate composition including a dipentaerythritol pentaacrylate; and
ii) a polytetrafluoroethylene lubricant.

27. The self-lubricating bearing of claim 26 wherein the coating comprises at least about 10 weight percent polytetrafluoroethylene lubricant.

28. The self-lubricating bearing of claim 26 wherein the surface comprises a metal, a plastic, a composite, or a ceramic material.

29. The self-lubricating bearing of claim 28 wherein the metal comprises an aluminum, or a steel.

30. The self-lubricating bearing of claim 26 wherein the acrylate composition further includes triethylene glycol dimethacrylate, epoxy novolac acrylate, or pentaerythritol tetraacrylate.

31. The self-lubricating bearing of claim 26 wherein the acrylate composition further includes a triethylene glycol dimethacrylate.

32. The self-lubricating bearing of claim 26 wherein the coating further includes less than about 1 weight percent of an aramid.

33. The self-lubricating bearing of claim 26 wherein the mixture includes:
at least about 10 weight percent of the polytetrafluoroethylene lubricant; and
at least about 30 weight percent of the acrylate composition,
wherein all weight percents are based on the weight of the mixture.

34. The self-lubricating bearing of claim 33 wherein the acrylate composition further comprises a triethylene glycol dimethacrylate.

35. The self-lubricating bearing of claim 33 wherein the mixture further includes less than about 1 weight percent of an aramid pulp.

36. A method of manufacturing a self-lubricating bearing, the method comprising:
a) applying a coating to at least a portion of a bearing surface, the coating comprising a mixture of a dipentaerythritol pentaacrylate and a polytetrafluoroethylene, and
b) curing the coating.

37. The method of claim 36 further comprising the step of cleaning the bearing surface with a blasting media before applying the coating to the bearing.

38. The method of claim 37 wherein the blasting media comprises aluminum oxide.

39. The method of claim 36 further comprising machining the coating to a desired thickness after curing.

40. The method of claim 39 further comprising post curing the coating after machining, the post curing being carried out at an elevated temperature.

41. The method of claim 36 wherein the mixture further comprises a triethylene glycol dimethacrylate, an epoxy novolac acrylate, or a pentaerythritol tetraacrylate.

42. The method of claim 36 wherein the mixture further comprises an aramid pulp.

43. The method of claim 36 wherein the coating is cured in an enclosed mold.

44. A surface coating comprising a mixture of:
a) a curable acrylate composition;
b) a solid lubricant; and
c) a thixotrope including an aramid pulp.

45. The surface coating of claim 44, in which said curable acrylate composition includes a dipentaerythritol pentaacrylate.

46. The surface coating of claim 44, wherein the solid lubricant comprises a polytetrafluoroethylene.

47. A method of manufacturing a coating, the method comprising:
admixing an initiator with a quantity of a curable acrylate to form a part A;
admixing an accelerator with another quantity of said curable acrylate to form a part B.
mixing said Part A with said Part B to form a mixture C,
mixing said mixture C with at least 10 weight percent of a solid lubricant to form a coating mixture, wherein the weight percent is based on the weight of the coating.

48. The method of claim 47 wherein the curable acrylate comprises a dipentaerythritol pentaacrylate.

49. The method of claim 47 wherein the solid lubricant includes polytetrafluoroethylene.

50. The surface coating of claim 1, wherein the curable acrylate composition further comprises an aliphatic urethane acrylate.

51. The method of claim 17 wherein the curable acrylate further comprises an aliphatic urethane acrylate.

52. The self lubricating bearing of claim 26 wherein the curable acrylate further comprises an aliphatic urethane acrylate.

53. The method of claim 36 wherein the coating further comprises an aliphatic urethane acrylate.

54. The method of claim 44 wherein the curable acrylate composition further comprises an aliphatic urethane acrylate.

55. The method of claim 47 wherein the curable acrylate further comprises an aliphatic urethane acrylate.

* * * * *

UNITED STATES PATENT AND TRADEMARK OFFICE
CERTIFICATE OF CORRECTION

PATENT NO. : 6,180,574 B1  Page 1 of 1
DATED : January 30, 2001
INVENTOR(S) : William E. Ryan, William R. Hubiak, Julia B. Allaway, Janice N. Fehrenbach, James M. Strause It is certified that error appears in the above-identified patent and that said Letters Patent is hereby corrected as shown below:

Column 3,
Line 25, after "obtain" [;] should be deleted and -- a -- should be added and sentence should continue in the same paragraph.
Line 28, before "viscosity" [increase] should be -- increased --.
Line 31, after "25" --: 75 -- should be added.
Line 33, before is [r,] should be -- ratio, -- .
Line 34, after "least" [abo] should be -- about --.

Column 7,
Line 3, before "stainless" [174] should be -- 17-4 --.

Signed and Sealed this

Sixteenth Day of October, 2001

Attest:

NICHOLAS P. GODICI
Attesting Officer  Acting Director of the United States Patent and Trademark Office